Feb. 7, 1961 J. A. FEIJOO ET AL 2,971,086
ANGLE-GATED PHASE DETECTOR
Filed March 28, 1958

J. A. Feijoo
D. W. Young, Jr.
INVENTORS

BY
ATTORNEY

ବ2,971,086
Patented Feb. 7, 1961

2,971,086
ANGLE-GATED PHASE DETECTOR

James A. Feijoo, North Hollywood, and David W. Young, Jr., Van Nuys, Calif., assignors to The Bendix Corporation, a corporation of Delaware Filed Mar. 28, 1958, Ser. No. 724,707

5 Claims. (Cl. 250—20)

This invention relates to phase detectors and is particularly useful in, although not limited to, phase detectors used in direction-finding systems in which the relative phase between two alternating potentials generated in two transducers or antennas by a traveling wave is a function of the angle of approach of the traveling wave.

Practical electronic phase detectors are ambiguous beyond a limited range, conventional types reversing the direction of their output in response to phase angles beyond 180°.

An object of the invention is to block the output of a phase detector when the phase difference between the input potentials thereto exceeds a predetermined range equal to or less than the non-ambiguous range.

Other objects and features will appear from the description to follow.

Briefly, the present invention consists in the combination of a conventional phase detector capable of delivering an output potential indicative of the phase angle measured, with a phase-sensitive gate that passes the output potential to an indicating device only when the phase angle lies within predetermined limits.

A common type of phase detector delivers an output potential varying in magnitude from a maximum negative value at a phase angle of $-90°$ to a maximum positive value at a phase angle of $+90°$. Beyond $-90°$, the output reverses direction and varies from its maximum negative value to its maximum positive value at $-270°$. Beyond $+90°$, the output reverses direction and varies from its maximum positive value to its maximum negative value at $+270°$. Hence, such a phase detector is ambiguous for phase angles beyond $\pm 90°$.

The present invention can be used to block indications produced by the phase angles between $+90°$ and $+270°$, and between $-90°$ and $-270°$. This is done by introducing an additional 90° shift between samples of the two waves, the phase difference between which is being measured by a first phase discriminator, and phase-detecting the modified samples in a second phase discriminator to produce a second potential that reaches a maximum value of one polarity when the original waves are in phase. This second potential is then used to actuate a gate to pass the output of the main discriminator only when the second potential is of said one polarity and exceeds a predetermined value.

A full understanding of the invention may be had from the following detailed description with reference to the drawing, in which.

Figure 1:
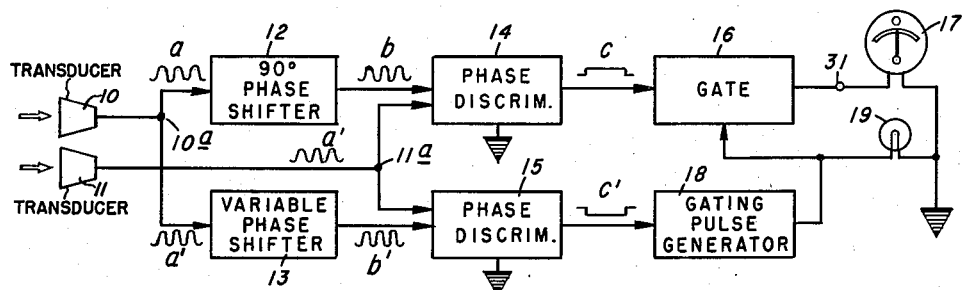
Fig. 1 is a block diagram of a circuit incorporating the invention for indicating the angle of approach of space waves.

Fig. 1 shows a system for receiving pulsed space waves from a distant point and determining their direction. The waves are received on two transducers 10 and 11, respectively, positioned in a common frontal plane and spaced apart so that an approaching wave impinges on both transducers simultaneously if it is approaching in a direction normal to the frontal plane, but impinges on the two transducers at time-spaced intervals if the wave is approaching at an angle to the normal plane. In the case of electromagnetic waves, the transducers 10 and 11 may be antennas. Alternatively, in the case of pressure waves in air or water, they may be microphones. Regardless of the nature of the space wave, it generates electrical waves at the output terminals $10a$ and $11a$ of the two transducers 10 and 11, which are in phase if the direction of approach is perpendicular to the frontal plane, and out of phase in direction and extent dependent upon the angle of approach.

The electrical waves $a$ at the transducer output terminal $10a$ and the electrical waves $a'$ at the transducer output terminal $11a$ are applied to a first phase detector including a 90° phase shifter 12 and a phase discriminator 14, and to a second phase detector including a variable phase shifter 13 and a phase discriminator 15.

The phase discriminators 14 and 15 are each of a well known type that produces an output potential $c$ or $c'$ that varies in magnitude from a maximum value of one polarity when the waves applied thereto are in phase, to a maximum value of the opposite polarity when the waves are 180° out of phase either in the positive or negative direction. The output $c$ of the first phase detector is passed by a gate 16, when the latter is open, to an output terminal 31, which is shown connected to an indicator 17 illustrated as a meter capable of reading in either direction from center zero. The output $c'$ of the second phase detector is applied to a gating pulse generator 18 which generates a pulse constituting a control potential to open the gate 16 only when the pulse $c'$ is of a selected polarity and exceeds a selected magnitude. The output of the generator 18 may also be applied to an indicating lamp 19 to indicate whether or not space waves are being received. The reason for this is that the indicator 17 will give a zero indication both when waves are being received in direction perpendicular to the frontal plane of the transducers 10 and 11, and when no waves are being received. The indicator 19 eliminates the ambiguity that would otherwise exist.

Figure 3:
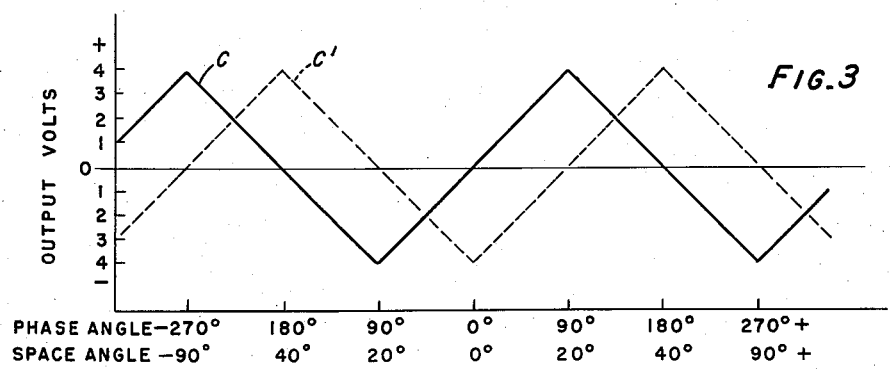
Fig. 3 is a graph illustrating the operation of the system.

The general operation of the system of Fig. 1 will now be described with reference to the graph of Fig. 3, in which the outputs $c$ and $c'$ of the two phase discriminators 14 and 15 are plotted against phase angle. For the present, consider that the variable phase shifter 13 is adjusted to produce no phase shift. Its purpose will be described later. Under this condition, the two input potentials $a$ and $a'$ are directly phase-compared in the phase discriminator 15 to produce an output of polarity and magnitude indicated by curve $c'$ in Fig. 3. It will be observed that the potential $c'$ varies linearly from a positive maximum value at $-180°$ phase difference to a maximum negative value at zero phase difference, and back to a positive maximum value at $+180°$ phase difference. On the other hand, because of the 90° phase shifter 12, the potential $c$ varies from a maximum negative value at $-90°$ to a maximum positive value at $+90°$, and is non-ambiguous between $-90°$ and $+90°$. However, since it reverses direction at $-90°$ and $+90°$, it gives ambiguous readings beyond those limits. Ambiguous readings from $-90°$ to $-270°$ and from $+90°$ to $+270°$ are prevented by making the gating pulse generator 18 respond only to negative values of potential $c'$ to open the normally-closed gate 16.

It may sometimes be desirable to work on a narrower phase band than that between $+$ and $-$ 90°. This can be done by making the gating pulse generator 18 respond only to negative potentials exceeding some desired value greater than zero. In the arbitrary conditions assumed in connection with Fig. 3, the maximum negative and positive values are four volts. If the gating pulse generator 18 is made to respond only to negative potentials exceeding two volts, then the gate would be opened between −45° and +45°.

It may also be desirable under some conditions to confine the working band to a range not symmetrically disposed relative to the zero phase position. Thus, it might be desired to make the system responsive only to phase differences between zero and −90° or between zero and +90°. This can be accomplished by first adjusting the pulse generator 18 to deliver a gating pulse only in response to negative potentials exceeding two volts, as previously described, and also adjusting the variable phase shifter 13 to shift the phase characteristic (c') 45° in one direction or the other.

In a system such as that shown in Fig. 1 for determining the angle of approach of space waves, the phase angle shift between the electrical outputs of the transducers 10 and 11 produced by a given change in the angle of approach of the space waves depends upon the wave length and the lateral spacing of the transducers. If the lateral spacing is large in terms of the wave length, the phase angle will shift much more rapidly than the space angle. Fig. 3 is plotted for the particular condition where the effective lateral spacing between the transducers is ¾ of the wave length of the received space waves. The system therefore has high sensitivity for small angles, since a space angle shift of only 20° produces a phase angle shift of 90°.

The system has application both to continuous wave reception and to pulse wave reception. However, its greatest utility is in connection with pulsed signals, since it enables the distinguishing of desired signals approaching at a small angle of incidence from unwanted signals approaching at greater angles of incidence. Thus, with continuous waves, the desired wave of low angle would keep the gate 16 open so that the unwanted signals would also pass to the indicator and give ambiguous readings. On the other hand, with pulsed signals it is unlikely that the pulses from the wanted and unwanted signals would occur simultaneously, so that usually only the wanted signals would pass the gate 16.

Figure 2:
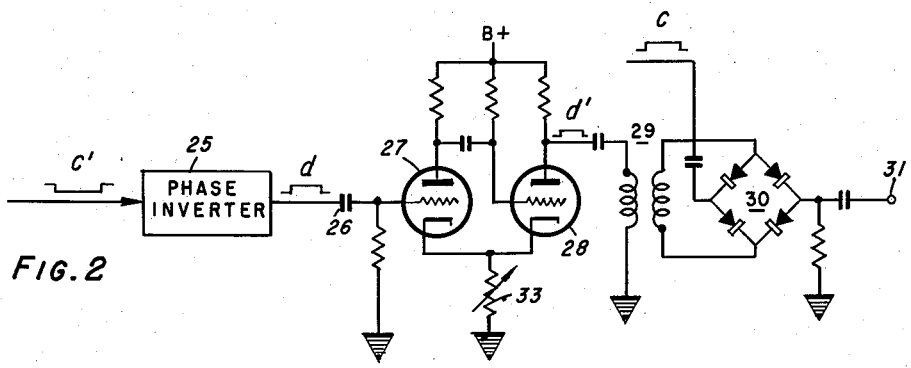
Fig. 2 is a schematic diagram showing a particular circuitry that can be employed for some of the blocks in the system of Fig. 1.

Fig. 2 shows a simple circuit that may be employed as the gate 16 and the gating pulse generator 18 of Fig. 1. As has been explained in connection with Fig. 3, the gating pulse generator 18 is supposed to respond to negative-going pulses to open the gate 16. Such a pulse (c') is indicated in Fig. 2. This pulse is first inverted by a phase inverter 25 to produce a corresponding positive pulse d which is applied through a capacitor 26 to the grid of one tube 27 of a conventional monostable multivibrator circuit, the other tube 28 of which is normally conducting so that the potential at its plate is low. Upon application of the pulse d to the grid of tube 27, the latter conducts, and the tube 28 ceases to conduct, whereupon its plate potential rises to produce an output pulse d' which is applied through a transformer 29 to one pair of diagonal points of a bridge detector 30. The output (pulse c) of the phase discriminator 14 is connected through the other pair of diagonal points of the bridge to the output terminal 31. The bridge detector 30 normally presents a high impedance to the pulse c, but is rendered conductive during application of the pulse d' from the tube 28.

The potential on the grid of the tube 27 necessary to trigger the multivibrator depends upon the characteristics of the circuit, including the resistance of the common cathode biasing resistor 33. By making this resistor adjustable, the threshold potential of the multivibrator can be varied to respond only to negative pulses (c') of desired value, to vary the effective phase band of the system as previously described.

It is to be noted that the phase responses of the first and second detectors may be varied individually without altering the phase relation between their outputs c and c'. Thus, the 90° phase shifter 12 in the first detector can be eliminated, and a 90° phase shifter of opposite sign inserted in the second detector in series with phase shifter 13. Alternatively, the variable phase shifter 13 can be transferred from the second phase detector to the first. Any phase-shifting circuit can be used that will center a peak of the characteristic (c') (Fig. 3) in the range of characteristic (c) that is to be indicated.

Although for the purpose of explaining the invention a particular embodiment thereof has been shown and described, obvious modifications will occur to a person skilled in the art, and I do not desire to be limited to the exact details shown and described.

We claim:
1. Apparatus for indicating selected phase differences, to the exclusion of other phase differences, between two alternating input potentials of the same frequency on two input terminals comprising: a first phase detector connected to said input terminals for producing a signal potential varying according to a desired pattern in response to a phase change between said input potentials through a selected phase angle range; an output terminal; gating means connecting said first detector to said output terminal and responsive to a control potential for selectively applying said signal potential from said first detector to said output terminal; a second phase detector connected to said input terminals and so constructed and arranged as to produce a control potential varying from a maximum magnitude at a selected phase angle within said selected range to lesser magnitudes in response to phase departures from said selected phase angle; and means for applying said control potential to said gating means.

2. Apparatus according to claim 1 in which each of said phase detectors comprises a phase discriminator of the same type and one of said detectors includes phase-shifting means ahead of its discriminator for phase-shifting the output of that detector relative to the output of the other detector.

3. Apparatus according to claim 1 in which said first detector is so constructed and arranged as to produce a signal potential varying in one direction in response to a phase change from one end of said selected range to the other.

4. Apparatus according to claim 3 in which said selected phase angle is at the midpoint of said selected phase angle range.

5. Apparatus according to claim 1 including a pair of transducers respectively connected to said input terminals and responsive to space waves to generate electrical waves of corresponding frequency and apply them to said input terminals; said transducers being positioned in a common frontal plane and so laterally spaced relative to the wave length of said space waves that the electrical phase angle between the outputs of the transducers increases more rapidly than the angle of incidence of space waves on said transducers.

References Cited in the file of this patent

UNITED STATES PATENTS

| | | |
|---|---|---|
| 2,438,526 | Waterman | Mar. 30, 1948 |
| 2,509,207 | Busignies | May 30, 1950 |
| 2,519,521 | Weighton | Aug. 22, 1950 |
| 2,706,793 | Alvarez et al. | Apr. 19, 1955 |
| 2,713,677 | Scott et al. | July 19, 1955 |
| 2,719,940 | West | Oct. 4, 1955 |
| 2,751,555 | Kirkpatrick | June 19, 1956 |
| 2,758,278 | Adams | Aug. 7, 1956 |
| 2,787,776 | Rudy | Apr. 2, 1957 |
| 2,808,583 | Mathes | Oct. 1, 1957 |
| 2,866,092 | Raynsford | Dec. 23, 1958 |
| 2,890,329 | Lebenbaum | June 6, 1959 |